(12) United States Patent
Hale et al.

(10) Patent No.: US 11,005,730 B2
(45) Date of Patent: May 11, 2021

(54) SYSTEM, METHOD, AND APPARATUS FOR HIGH THROUGHPUT INGESTION FOR STREAMING TELEMETRY DATA FOR NETWORK PERFORMANCE MANAGEMENT

(71) Applicant: SevOne, Inc., Boston, MA (US)

(72) Inventors: Brandon Hale, Wilmington, DE (US); Sean Lafferty, Voorhees, NJ (US)

(73) Assignee: SevOne, Inc., Boston, MA (US)

( * ) Notice: Subject to any disclaimer, the term of this patent is extended or adjusted under 35 U.S.C. 154(b) by 0 days.

(21) Appl. No.: 16/517,083

(22) Filed: Jul. 19, 2019

(65) Prior Publication Data

US 2020/0028756 A1 Jan. 23, 2020

Related U.S. Application Data

(60) Provisional application No. 62/701,253, filed on Jul. 20, 2018.

(51) Int. Cl.
*H04L 12/24* (2006.01)
*G06F 16/13* (2019.01)
(52) U.S. Cl.
CPC ........ *H04L 41/5009* (2013.01); *G06F 16/137* (2019.01); *H04L 41/0266* (2013.01); *H04L 41/5032* (2013.01)
(58) Field of Classification Search
CPC ............. H04L 41/5009; H04L 41/5032; H04L 41/0266; H04L 9/0894; G06F 16/137
See application file for complete search history.

(56) References Cited

U.S. PATENT DOCUMENTS

| | | | |
|---|---|---|---|
| 6,804,714 B1 * | 10/2004 | Tummalapalli | ..... H04L 41/5009 707/999.003 |
| 9,639,546 B1 * | 5/2017 | Gorski | .................. G06F 16/172 |
| 9,898,478 B2 * | 2/2018 | Vijayan | .................. H04L 67/02 |
| 2004/0064293 A1 | 4/2004 | Hamilton et al. | |

(Continued)

FOREIGN PATENT DOCUMENTS

WO 2020018927 1/2020

OTHER PUBLICATIONS

PCT/US2019/042641, "International Application Serial No. PCT/US2019/042641, International Search Report and Written Opinion dated Oct. 2, 2019", SevOne, Inc., 12 pages.

*Primary Examiner* — Aaron N Strange
(74) *Attorney, Agent, or Firm* — GTC Law Group PC & Affiliates

(57) ABSTRACT

An example method includes collecting network performance data from a number of network devices, where the network performance data includes a unique key; dividing the network performance data into a metadata portion and a performance data portion; and associating each of the metadata portion and the performance data portion with a corresponding unique key. The method further includes storing the metadata portion at a first location, storing the performance data portion at a second location, and providing a performance report in response to a request for a performance query, where providing the performance report includes matching at least a portion of the metadata portion with a corresponding portion of the performance data portion.

27 Claims, 7 Drawing Sheets

(56) References Cited

U.S. PATENT DOCUMENTS

| | | | |
|---|---|---|---|
| 2012/0066493 A1* | 3/2012 | Widergren | H04L 63/0428 |
| | | | 713/160 |
| 2013/0111576 A1 | 5/2013 | Devine et al. | |
| 2014/0207416 A1* | 7/2014 | Bakalov | H04L 12/28 |
| | | | 702/186 |
| 2016/0021014 A1 | 1/2016 | Wetterwald et al. | |
| 2017/0264513 A1 | 9/2017 | Pietrowicz et al. | |
| 2018/0351836 A1* | 12/2018 | Guim Bernat | G06F 11/3433 |
| 2019/0026187 A1* | 1/2019 | Gulam | G06F 9/45558 |
| 2019/0342315 A1* | 11/2019 | Smelov | H04L 43/06 |

* cited by examiner

SYSTEM, METHOD, AND APPARATUS FOR HIGH THROUGHPUT INGESTION FOR STREAMING TELEMETRY DATA FOR NETWORK PERFORMANCE MANAGEMENT

CROSS-REFERENCE TO RELATED APPLICATIONS

The present application claims priority to U.S. Provisional Patent Application U.S. 62/701,253, entitled "SYSTEM, METHOD, AND APPARATUS FOR HIGH THROUGHPUT INGESTION FOR STREAMING TELEMETRY DATA FOR NETWORK PERFORMANCE MANAGEMENT", filed on 20 Jul. 2018.

The foregoing application is incorporated herein by reference in the entirety for all purposes.

BACKGROUND

Field

This disclosure is related to network performance management using streaming telemetry data, and more particularly but not exclusively relates to utilizing discrete channels for performance data and metadata.

Description of Related Art

Presently known systems for streaming network performance data suffer from a number of drawbacks. Previously known network performance data communication systems receive network performance data and metadata, resolve the data, and send the matched network performance data and the metadata after the resolution. Network performance data and metadata are sent at varying time scales, often with metadata sent infrequently and/or where metadata has to be retrieved intentionally. Accordingly, network performance data is only usable after a delay period, which reduces the performance optimization available to a network management system utilizing the data. Further, data collection systems are required to utilize significant system resources to cache data until the resolution is completed, and to have cache validation (or invalidation) operations that are purpose built for the particular domain. Accordingly, net data collection rates for previously known systems are low, and resource utilization, including storage and processing operations for the network performance data, is high.

SUMMARY

An example method includes collecting network performance data from a number of network devices, the network performance data including a unique key; dividing the network performance data into a metadata portion and a performance data portion, and associating each of the metadata portion and the performance data portion with a corresponding unique key; storing the metadata portion at a first location, and storing the performance data portion at a second location; receiving a request for a performance query; and providing a performance report in response to the request, wherein providing the performance report includes matching at least a portion of the metadata portion with a corresponding at least a portion of the performance data portion.

Certain further aspects of the example method are described following, any one or more of which may be present in certain embodiments. An example method further includes: where the unique key includes a deterministic hash value; and/or collecting a first network performance data value consisting of only performance data and a first unique key, collecting a second network performance data value including metadata and the first unique key, and associating the first network performance data value with the metadata of the second network performance data value in response to the first unique key. An example method includes where the providing the performance report further includes determining a time series data for the performance data portion at least partially in response to the metadata portion, and/or where providing the performance report further includes aggregating the performance data portion at least partially in response to the metadata portion. An example method includes: where the associating each of the metadata portion and the performance data portion is performed after the receiving the request for a performance query; storing an association relationship between the metadata portion and the performance data portion in response to the associating; where the metadata portion further includes a context tag, and wherein the providing the performance report is further in response to the context tag; where the context tag includes at least one of: a vendor, a location, a rack value, an application value, and a line of business value; and/or where the context tag includes at least one of: a flow record value, a service utilized value, a file accessed value, a destination value, an application utilized value, and a business related value. An example method includes: where the providing the performance report further includes aggregating at least a portion of the performance data portion in response to the context tag; tracking a change in response to the metadata portion, and where the providing the performance report is further in response to the tracked change; and/or processing raw network performance data to add a number of context tags to the raw network performance data and thereby generate processed network performance data, and wherein the collecting network performance data includes collecting the processed network performance data.

An example system includes a network performance data collection layer structured to collect network performance data from a number of network devices, the network performance data including a unique key; a data distribution layer structured to divide the network performance data into a metadata portion and a performance data portion; and a query management layer structured to provide a performance report in response to receiving a request for a performance query, and further structured to provide the performance report by associating each of the metadata portion and the performance data portion with a corresponding unique key.

Certain further aspects of the example system are described following, any one or more of which may be present in certain embodiments. An example system includes: where the unique key includes a deterministic hash value; a performance change layer structured to identify a trigger event in response to the performance data portion; a performance data storage layer structured to store at least a portion of the performance data portion in a responsive memory location; where the performance data storage layer is further structured to store the at least a portion of the performance data portion in the responsive memory location in response to an identified trigger event. An example system includes: a means for aggregating the network performance data in response to a flow record; a means for adding context tags to raw network performance data to create processed network performance data, wherein the network performance data includes the processed network performance data; and/or a means for adding context tags to the stored at least a portion of the performance data portion. An example system includes: where the metadata portion includes at least one context tag, the system further including a means for detecting a trigger event in response to a context tag; and/or where the metadata portion includes at least one context tag, the system further including a means for aggregating the network performance data in response to the at least one context tag.

An example system includes a network performance data collection layer structured to collect network performance data from a number of network devices, the network performance data including a unique key; a data distribution layer structured to divide the network performance data into a metadata portion and a log data portion; and a query management layer structured to provide a performance report in response to receiving a request for a performance query, and further structured to provide the performance report by associating each of the metadata portion and the log data portion with a corresponding unique key. An example system further includes where the unique key includes a deterministic hash value.

An example system includes a network performance data collection layer structured to collect network performance data from a number of network devices, the network performance data including a unique key; a data distribution layer structured to divide the network performance data into a metadata portion and a flow record data portion; and a query management layer structured to provide a performance report in response to receiving a request for a performance query, and further structured to provide the performance report by associating each of the metadata portion and the flow record data portion with a corresponding unique key. An example system further includes where the unique key includes a deterministic hash value.

An example method includes collecting network performance data from a number of network devices, the network performance data including a unique key, wherein the network performance data includes metadata; receiving a request for a performance query; and providing a performance report in response to the request, wherein providing the performance report includes processing the metadata in response to the unique key.

Certain further aspects of the example method are described following, any one or more of which may be present in certain embodiments. An example method includes: where the metadata further includes a context tag, and wherein the providing the performance report is further in response to the context tag; where the context tag includes at least one of: a vendor, a location, a rack value, an application value, and a line of business value; and/or where the context tag includes at least one of: a flow record value, a service utilized value, a file accessed value, a destination value, an application utilized value, and a business related value. An example method includes: where the network performance data further includes a performance data portion; associating the metadata with the performance data portion in response to the unique key, and where the providing the performance report further includes aggregating at least a portion of the performance data portion in response to the context tag; and/or where the unique key includes a deterministic hash value.

DETAILED DESCRIPTION OF ILLUSTRATIVE EMBODIMENTS

Figure 1:
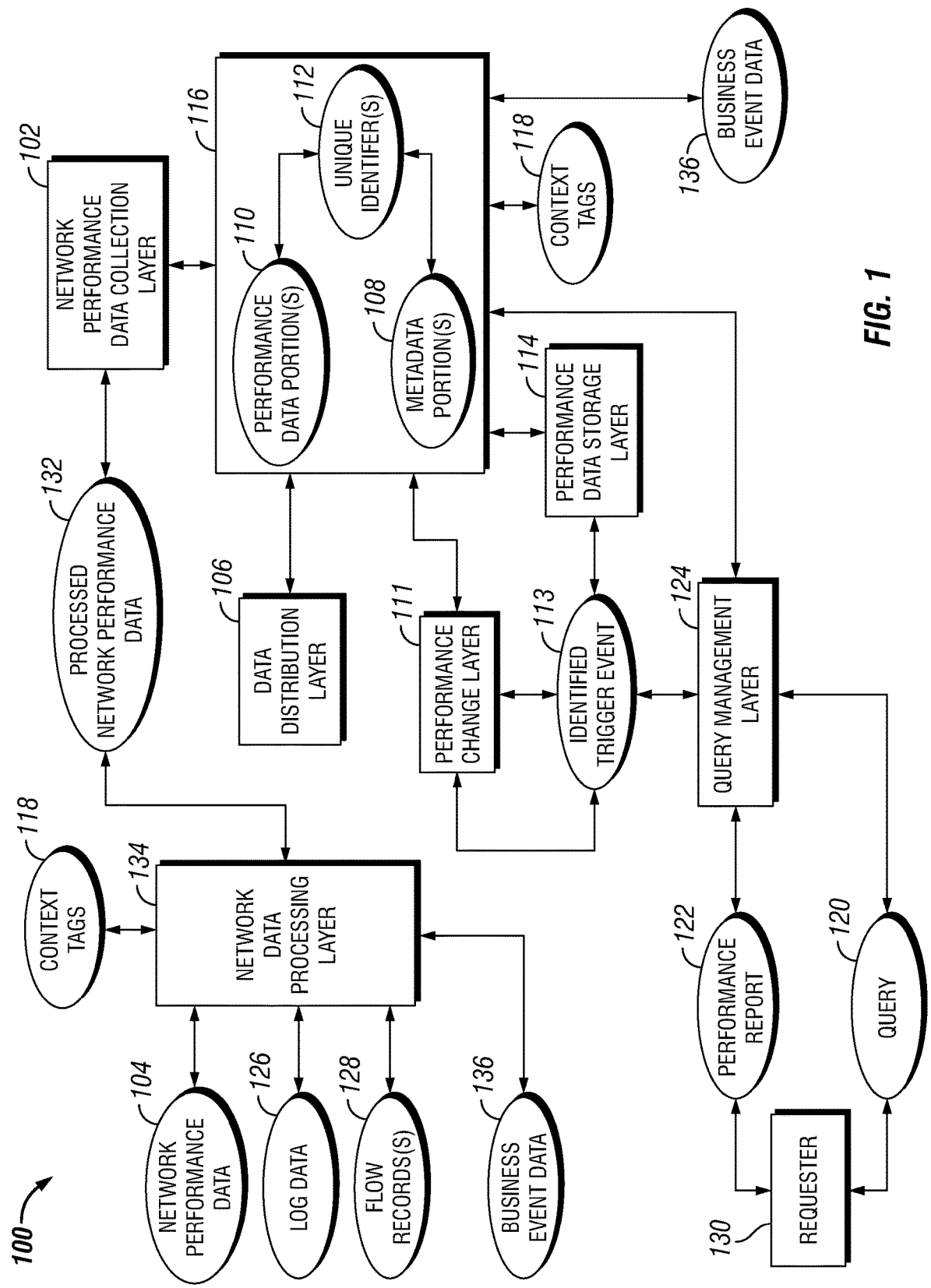
FIG. 1 is a schematic illustration of a system for high throughput ingestion for streaming telemetry data for network performance management and/or business analysis.

Referencing FIG. 1, an example system 100 for high throughput ingestion for streaming telemetry data for network performance management, and/or for supporting business analysis is depicted. The example system 100 is depicted with layers that are structured to functionally execute certain operations of the system. A layer, as utilized herein, may be implemented with one or more computing devices, circuits, processors, memory storage, computer readable instructions that, when executed by a computer, cause the layer to perform one or more operations of the layer, data structures, communication and/or networking components, logic circuits, input devices, output devices, and/or utilizing any other components. In certain embodiments, any devices, schematic depictions, and/or operations throughout the present disclosure may be utilized to implement one or more aspects of a layer.

The example system 100 includes a network performance data collection layer 102 that collects network performance data 104 from a number of network devices, where the network performance data includes a unique identifier 112 (e.g., a unique key, a deterministic hash value, and/or one or more metadata values that uniquely identify a data source and/or data collector, or that are statistically likely to uniquely identify the data source and/or the data collector). The example system 100 further includes a data distribution layer 106 that divides the network performance data 104 into a metadata portion 108 and a performance data portion 110. The example system 100 further includes a query management layer 124 that provides a performance report 122 in response to receiving a request (e.g., query 120) for a performance query. The example system 100 depicts a requester 130 communicating the query 120, although in certain embodiments a query 120 may be generated automatically, provided periodically, and/or generated in response to an identified trigger event 113. The example query management layer 124 further provides the performance report 122 by associating each of the metadata portion 108 and the performance data portion 110 with a corresponding unique key 112. The example system 100 depicts the performance report 122 communicated to the requester 130, although the performance report 122 may be communicated to another user that is not the requester 130, or provided to another user where the performance report 122 was generated without a requester 130.

Certain further aspects of an example system 100 are described following, any one or more of which may be present in certain embodiments. An example system 100 further includes a performance change layer 111 structured to identify a trigger event 113 in response to the performance data portion. Example and non-limiting trigger events 113 include determining that a metadata value (e.g., a network infrastructure aspect) has changed, determining that a network performance value (e.g., utilization, uptime or other performance goals, lag times or delays, etc.) has changed, and/or determining that a business relevant event has occurred (e.g., using context tags 118 to associate network performance data 110 to business relevant events, which may be received as business event data 136 and/or may be associated with the context tags 118). Business event data 136 may be configured by a user or administrator, and/or received according to configured rules relating to a business, such as which servers, applications, or data are associated with particular business units, types of business transactions, or the like. The example system 100 includes a performance data storage layer 114 that stores at least a portion of the performance data portion in a responsive memory location (e.g., a high performance database—reference FIGS. 3-5 and the related disclosure). The example system 100 includes one or more memory stores 116 that may include responsive memory locations, long-term data storage locations, and/or combinations of these. In certain embodiments, one or more memory stores 116 may be provided on computing devices shared with other layers in the system, in communication with other layers in the system, and/or distributed across combinations of these. In certain embodiments, one or more memory stores 116 may be a cloud storage location and/or a remote storage location.

An example system 100 includes the performance data storage layer 114 further storing at least a portion of the performance data portion 110 in the responsive memory location in response to an identified trigger event 113. For example, where a trigger event 113 is identified, in certain embodiments the performance data storage layer 114 may store a portion of the performance data portion 110 (e.g., performance data related to the trigger event 113) in the responsive memory location (e.g., a high performance database) where it would otherwise be sent to long-term storage, and/or may retain the portion of the performance data portion 110 in the responsive memory location for a longer period of time than for ordinary processing—for example to facilitate rapid generation of a performance report 122, and/or to facilitate further queries 120 related to the trigger event 113 that may be expected to be forthcoming.

An example system 100 further includes a means for aggregating the network performance data 104 in response to a flow record 128. Without limitation to any other aspect of the present disclosure, example and non-limiting means for aggregating the network performance data 104 in response to a flow record 128 include operations to provide one or more context tags 118 that relate metadata 108 and/or performance data 110 to flow records 128, summing data (flow record data, performance data, metadata, and/or tags), counting instances or other aspects of elements of data (flow record data, performance data, metadata, and/or tags), averaging data (flow record data, performance data, metadata, and/or tags), summarizing data (flow record data, performance data, metadata, and/or tags), reducing data (flow record data, performance data, metadata, and/or tags), and combinations of these. An example system 100 includes the flow record data as at least one of: usage of a particular application or group of applications; data communications with a source server, website, and/or network location; data communications with a destination server, website, and/or network location; utilization of a service (e.g., voice and/or video communications); geographical correlations of these; time related correlations of these; and/or quality descriptions of these. In certain embodiments, a processed description of the flow record 128 is stored—for example an event and/or summarizing information related to the flow record 128. In certain embodiments, raw flow data 128 is stored—for example to facilitate post-processing, later analysis, impacts to network performance, and/or future design or upgrades to hardware devices and/or network infrastructure.

An example system 100 further includes a means for adding context tags 118 to raw network performance data 104 to create processed network performance data 132, where the network performance data as received by the network performance data collection layer 102 is the processed network performance data 132. In certain embodiments, without limitation, an example means for adding context tags 118 to raw network performance data 104 includes devices consistent with operations of FIG. 2. An example system 100 further includes a means for adding context tags 118 to the stored at least a portion of the performance data portion 110. In certain embodiments, without limitation, example means for adding context tags 118 to the performance data portion 110 include devices consistent with operations of FIGS. 3 and 5. In certain embodiments, the processed network performance data 132 may be prepared by a network data processing layer 134, which may be a separate processing device and/or separate processing function from the processor controlling the data store 116, and is depicted separately in the example of FIG. 1 for purposes of illustration. The network data processing layer 134 may access network performance data 104, log data 126, context tags 118, flow records 128, and/or business event data 136 to generate the processed network performance data 132. The network data processing layer 134 may be embodiment in operations of devices described in reference to FIGS. 2-4, and/or may include certain procedural subsets described in reference to FIG. 5, without limitation to any other aspect of the present disclosure.

In certain embodiments, an upstream data collector (e.g., that takes performance data and/or metadata from a number of data sources, before providing the network performance data 104 to system 100) adds one or more context tags 118 to the raw network performance data 104, thereby contributing at least an aspect of the processed network performance data 132. An example supplies one or more tags, for example discovered from the endpoint (e.g., data source) being monitored. For example, an upstream data collector includes an Internet DMZ router's CPU measurements, from the Cisco Internetwork operating system (Cisco IOS®). Example context data 118 includes the name of the source collector (SNMP) and the endpoint's IP address, such as depicted following:

```
{
"metricId": "5555-Cluster-DMZ|1|CPU1|cpuUtilization",
"name": "cpuUtilization",
"collector": {
"name": "SNMP"
},
"tags": {
"device": {
"ip": "192.58.9.2",
"name": "5555-Cluster-DMZ",
"type": "Generic"
},
"object": {
```

-continued

```
    "name": "CPU1",
    "type": "CPU (Cisco IOS)"
  }
}
```

In certain embodiments, context tag(s) 118 can additionally or alternatively be added to metadata, performance data, log data, and/or flow records at any point between creation of the network performance data (e.g. by the data source) to generation of the performance report, and in certain embodiments, can be created by an end user in response to the performance report (e.g., and saved or written back to the memory store 116 associated with the data). Accordingly, users are able to "decorate" data with additional context tags 118. For example, a user utilizing a user-interface and/or application programming interface (API) to the system 100, can utilize a query 120 to select a set of metrics matching the query 120, and apply one or more context tags 118 to the resulting data set (e.g., metadata, performance data, log data, and/or flow records). An example embodiment includes devices (e.g., data sources and/or network infrastructure elements) having a naming pattern such as NYNYC for New York City, and a user adds a location tag (e.g., :NewYork) for ease of access and readability. In certain embodiments, context tags 118 may be used recursively—for example context tags 118 of location:NewYork AND location:Newark could be queried and have another context tag 118 added such as region:Northeast. In certain embodiments, without limitation to any other disclosure herein, context tags 118 can include spatial information (e.g., rack and row location in a data center, financial tags such as a cost center owning an asset, operational tags such as what group to call in the event of an outage, and/or logical tags, such as what business service does a given asset support).

Figure 5:
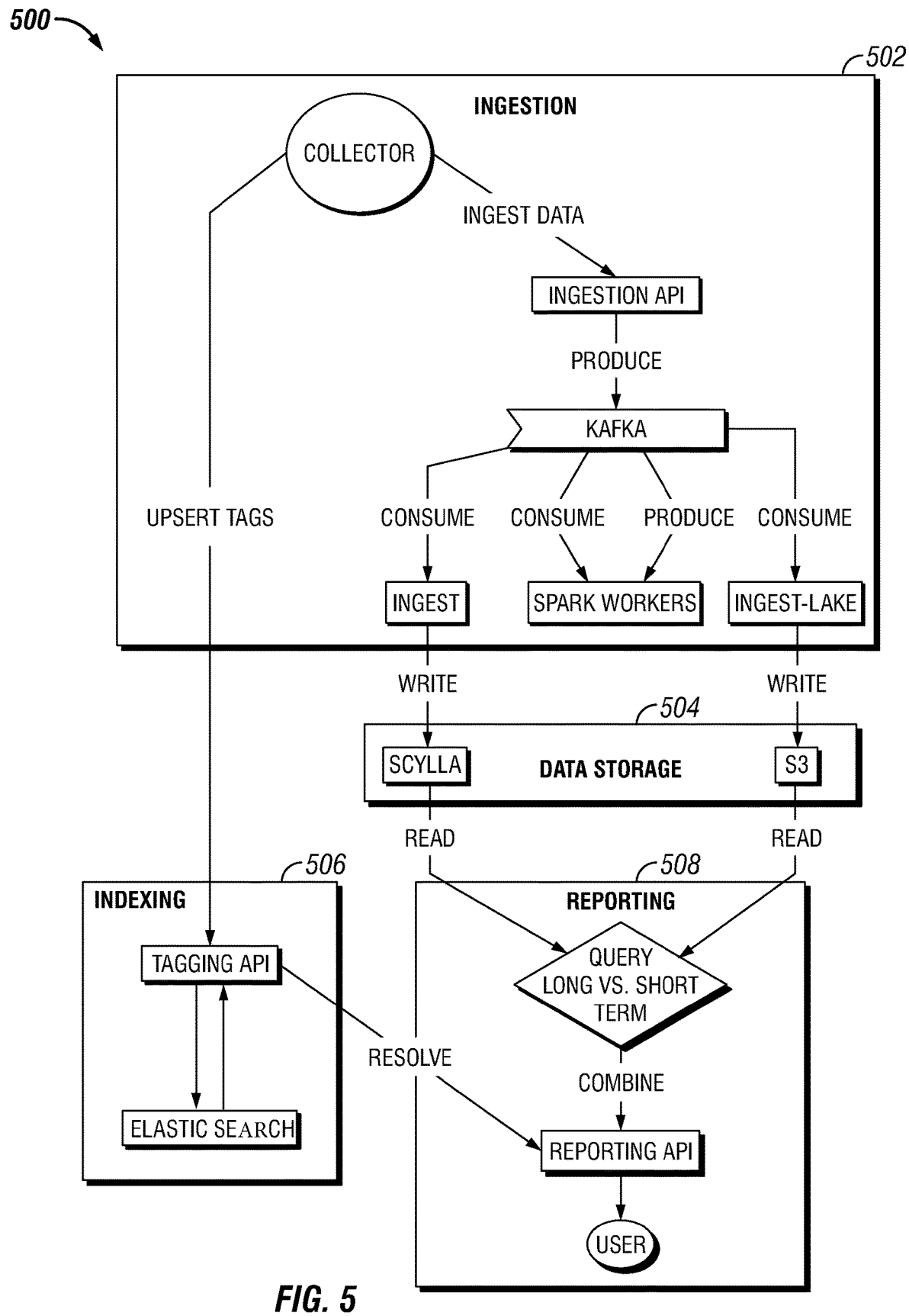
FIG. 5 is a schematic flow diagram depicting an example procedure for providing high throughput ingestion of streaming telemetry data for network performance management, event detection, and alerting.

In certain embodiments, the system 100 includes the metadata portion 108 including context tag(s) 118, where the performance change layer 111, Spark Workers (e.g., compute nodes of an analytics engine such as the ApacheSpark™ brand unified analytics engine, reference FIG. 5), or other event detection devices or operations herein utilize the context tag(s) 118 of the metadata portion 108 to detect trigger events 113. Example and non-limiting metadata portions 108 include at least one context tag 118, where the system 100 further includes a means for aggregating the network performance data 104 in response to the at least one context tag 118. In certain embodiments, without limitation, an example means for aggregating the network performance data 104 in response to the at least one context tag 118 includes operations (e.g., of the query management layer 124 and/or Spark Workers) to sum data, count instances or other aspects of elements of data, average data, summarize data, reduce data (flow record data, performance data, metadata, and/or tags), and/or combinations of these—for example relating performance data and/or metadata having a shared context tag.

An example system 100 includes the data distribution layer 106 dividing the network performance data into a metadata portion 108 and a log data portion (brought in as log data 126—not shown on memory store 116). The example system 100 includes the query management layer 124 providing a performance report 122 in response to receiving a request for a performance query 120, and further providing the performance report 122 by associating each of the metadata portion 108 and the log data portion (not shown) with a corresponding unique key 112. Example and non-limiting log data 126 includes information such as whether a resource was accessed (e.g., a web page, application, file, etc.) and/or whether the access was successful (e.g., expected working operation). Additionally or alternatively, log data 126 can include unsuccessful access, a reason or fault code for the unsuccessful access, and/or unauthorized access. For example, a log data entry may include information such as:

127.0.0.1—[05/Feb/2012:17:11:55+0000] "GET/HTTP/1.1" 200 140 "-" "Mozilla/5.0(Windows NT 6.1; WOW64) AppleWebKit/535.19 (KHTML, like Gecko) Chrome/18.0.1025.5 Safari/535.10"

In the example, the "GET/HTTP . . . " may indicate that a home page was accessed for the target location (e.g., the "/" denotes the home page), and the "200" code may indicate that the access operated properly. The described example is non-limiting, and any other indications available for log data 126 in any context may be utilized. In certain embodiments, the log data 126 may be utilized to determine usage, number of users, and/or for determining trigger events 113.

An example system 100 includes the data distribution layer 106 dividing the network performance data into a metadata portion 108 and a flow record portion (brought in as flow records 128—not shown on memory store 116). The example system 100 includes the query management layer 124 providing a performance report 122 in response to receiving a request for a performance query 120, and further providing the performance report 122 by associating each of the metadata portion 108 and the flow record portion (not shown) with a corresponding unique key 112. The flow record data may include any type of flow record data as described throughout the present disclosure.

Figure 2:
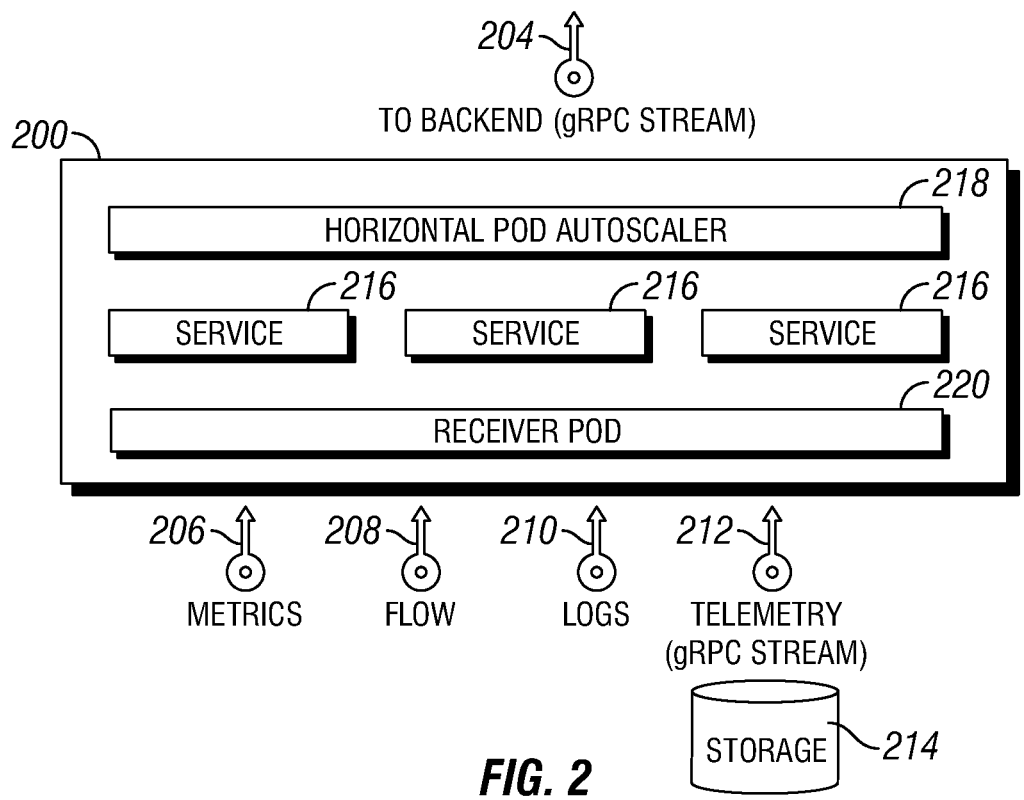
FIG. 2 is a schematic illustration of an edge collection device that receives metric data.

Referring to FIG. 2, an edge collection device 200 is depicted that receives metric data 206 (e.g., infrastructure performance data for network devices, virtual network functions, and/or private cloud infrastructure). The depicted edge collection device 200 includes edge collectors operating on a container orchestration engine (e.g., such as a Kubernetes® brand open-source container orchestration engine) behind a load balancer (e.g., service 220) in an autoscaling set. The example edge collection device 200 in FIG. 2 utilizes pods 216, each pod 216 including a scheduling unit (e.g., service 220) that groups containerized components of the network infrastructure, and utilizes a horizontal pod autoscaler 218. The number and content of pods 216 may be managed in real-time for load balancing or other considerations, and pods 216 may be created or closed throughout the operating life cycle of the edge collection device 200. The edge collection device 200 receives the metric data 206, flow data 208, logs 210, and telemetry data 212 (gRPC stream, in the example), and passes the podded, autoscaled data to a backend processor as a processed data stream 204, such as the backend processor depicted in FIG. 3. The edge collection device 200 in the example of FIG. 2 operates as a non-blocking collector, allowing for the collection of data as it is available, without requiring either the data sender to wait until all data elements (e.g., metadata) are available, and/or without caching data in a separate location until all data elements are available. In certain embodiments, data 206, 208, 210, 212 may be retrieved from a data storage 214, for example on the data provider side, and/or to manage communication bandwidth to the edge collection device 200. By contrast, previously known blocking collectors require time delays before data can be utilized for performance detection and management, additional resources to cache data to be passed to processing, and/or additional communication resources to re-communicate data from the providing device and/or from a cache system after the data is ready for processing. Operations performed by the edge collection device 200 in FIG. 2 may be referenced as edge collection operations, or streaming telemetry edge collection operations.

Figure 3:
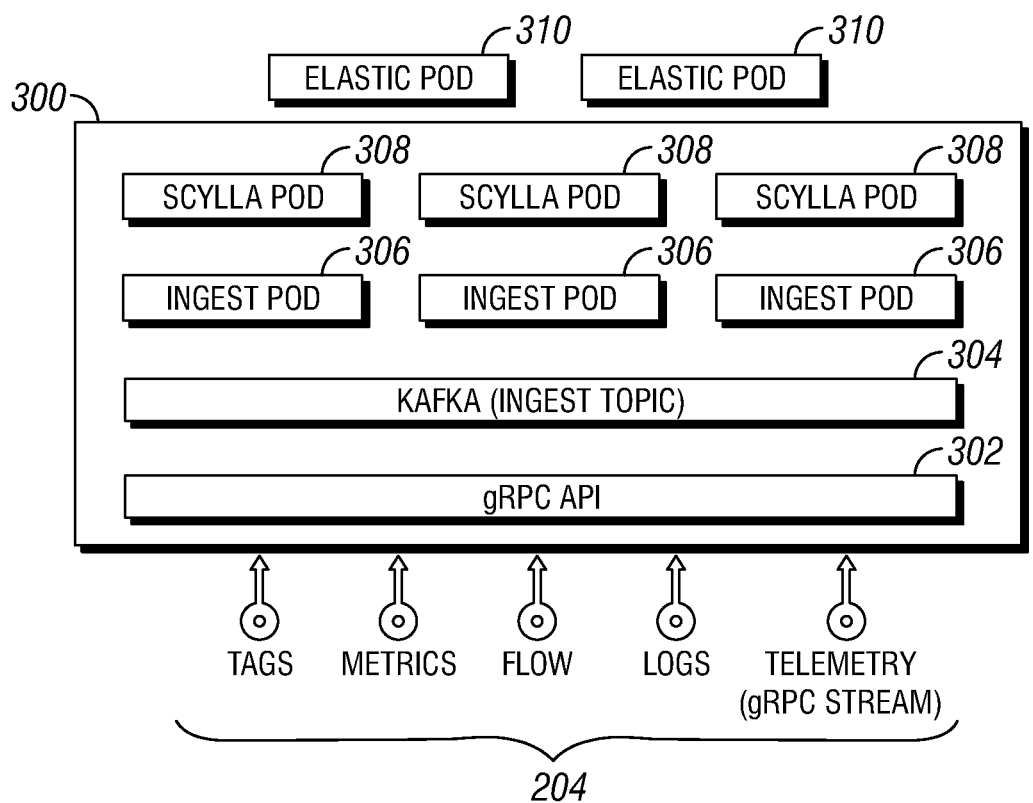
FIG. 3 is a schematic illustration of a backend processor that operates a high performance database.

Referencing FIG. 3, an example backend processor 300 is depicted that receives the processed data stream 204, and provides a transformed and packaged data set that is accessible for querying, reporting, and alerting an end user or a further application. The processed data may have tags or other metadata added to the data streams to provide context, enable certain types of alerting or aggregating, or to perform any other operations as described throughout the present disclosure. The tags or other metadata may be added by the edge collection device 200, by the backend processor 300, and/or by a separate service (not shown) operating on the processed data before receipt by the backend processor 300. The example backend processor 300 of FIG. 3 includes a remote procedure call framework API 302 (e.g., gRPC API) that authenticates the caller (e.g., the device, service, and/or infrastructure element providing the data stream 204), stores an audit trail (e.g., logs and tracing), and passes the data off to a distributed streaming platform manager 304 (e.g., a stream-processing software such as Apache Kafka® brand open-source stream-processing software, operating an Ingest Topic, in the example).

The distributed streaming platform manager 304 provides the data to respective ingestion pods 306 which are written into a high performance database 308 (e.g., Scylla pods, in the example). In certain embodiments, time series metrics are written to the high performance database 308 as soon as they are received. In certain embodiments, tags are received in a separate stream (e.g., within the processed data 204), and are stored (e.g., by an elastic pod 310, and or procedural subset 506 (reference FIG. 5)) to form an index of the time series data that can be matched with the corresponding processed data 204 during subsequent storage and/or in response to a query operation referencing the corresponding data.

In certain embodiments, the high performance database 308 provides for short-term storage of data, and data in the high performance database 308 may be eliminated when no longer needed, and/or may be moved into a long-term storage (e.g., reference FIG. 4) at a selected time. The utilization of the high performance database 308 provides for high speed operations to detect events, perform further processing, and/or make data readily available to queries. The example backend processor 300 further interfaces with elastic pods 310, which will be discussed further in the disclosure referencing FIG. 5. Operations performed by the backend processor 300 of FIG. 3 may be referenced as receive and ingest operations.

Figure 4:
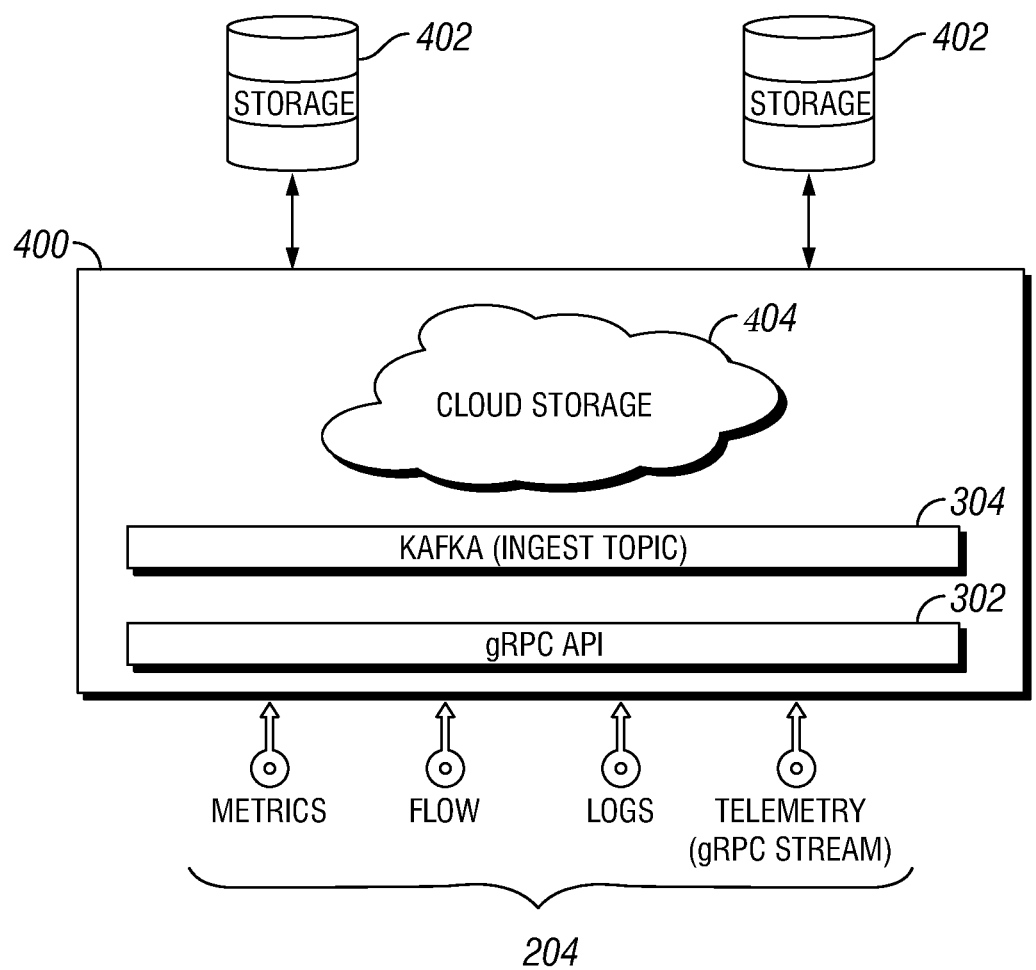
FIG. 4 is a schematic illustration of a processing device to operate a long-term storage.

Referencing FIG. 4, an example long-term storage device 400 is depicted that receives selected processed data 204, for example from a distributed platform manager, and stores the selected processed data 204 in a long-term storage 402, such as a cloud storage 402. In certain embodiments, the long-term storage device 400 utilizes a data pipeline service 404 (e.g., Google Cloud Dataproc™ managed service for processing large datasets) to process the storage of data into the long-term storage 402. The example of FIG. 4 stores the selected processed data 204 in cloud storage 402 such as Google Cloud Storage™ service and/or Amazon S3' cloud storage service, although any long-term storage service or device is contemplated herein. The received processed data 400 may be provided by an edge collection device 200, data moved from a high performance database 308 (e.g., from a short term storage location to a long term storage location), and/or updates or enhancements to data previously stored in long-term storage.

The data 204 stored in the long-term storage 402 is then available for archiving, long-term retention, and/or later batch processing at a selected time. The division of the data 204 into the high performance database 308 and the long-term storage 402 is a non-limiting example, and certain data elements may be stored, at least for a selected time period, in both the high performance database 308 and the long-term storage 402. In certain embodiments, the stored data is reduced (e.g., a smaller, representative data set may be produced from a larger data set) before storing in the long-term storage 402. Additionally or alternatively, intermediate determined data, data specifically processed for determining system changes, events, and/or for triggering or alerting, may be included in the long-term storage 402, partially included in the long-term storage 402, or omitted from the long-term storage 402. One of skill in the art, having the benefit of the disclosure herein and information ordinarily available about a streaming telemetry data processing system and/or supported services and/or a client application or entity, can readily determine which data to provide for the high performance database 308 and/or the long-term storage 402. Certain considerations for determining which data to provide for the high performance database 308 and the long-term storage 402 include, without limitation: the storage capacity and expense (e.g., power, processing, intermediate storage requirements, etc.) of each of the high performance database 308 and the long-term storage 402; the types and timing of queries or other requests for the data from the client; the time life cycle and value of specific data and types of data; the timing and characteristics of triggers, events, and alerts to be determined from the data; the timing and scope of batch processing to be performed on the data; the types of determinations made with regard to the data (e.g., detection of events, system changes, rate of change, logged events, flow records determinations); and/or the ability to re-create determined characteristics and/or determinations from the data, reduced data, and/or processed or intermediate elements of the data. Operations performed by the long-term storage device 400 of FIG. 4 may be referenced as receive and ingest data lake operations.

Referencing FIG. 5, an example schematic flow diagram depicts an example procedure 500 for providing high throughput ingestion of streaming telemetry data for network performance management, event detection, and alerting. The example schematic flow diagram includes a first procedural subset 502 for ingestion of streaming telemetry data, a second procedural subset 504 for data storage of streaming telemetry data, a third procedural subset 506 for indexing of streaming telemetry data, and a fourth procedural subset 508 for reporting of streaming telemetry data. The described procedure 500 is depicted in an example arrangement of operations, however any arrangement of procedural subsets 502, 504, 506, 508 is contemplated herein, including the re-ordering in whole or part and/or omission in whole or part of procedural subsets 502, 504, 506, 508 and/or operations within the procedural subsets 502, 504, 506, 508. Additionally or alternatively, various portions of the streaming telemetry data may be processed within various operations of procedural subsets 502, 504, 506, 508 at the same time, out of order received, and/or the same data or representations thereof may be processed within various operations of procedural subsets 502, 504, 506, 508 at the same time (e.g., where data is accessed related to a query, and is simultaneously being moved to long-term storage, checked for occurrence of an event, etc.).

The example procedure 500 includes the first procedural subset 502 for ingestion of streaming telemetry data, including operations of a collector, which may be an edge collection device 200 such as that depicted in FIG. 2. In certain embodiments, the operations of the collector include passing ingest data to an ingest API (e.g., such as depicted in FIG. 3). In certain embodiments, the ingest data may have related metadata and/or tags, and/or may be passed without related metadata and/or tags. In certain embodiments, a given stream of ingest data includes only metadata and/or tags. In certain embodiments, the ingest data includes a deterministic hash value within the data. A deterministic hash value indicates that the hash value is unique to a particular network resource (e.g., hardware, a service, a router, a node, etc.), even if the particular network resource cannot be identified from the hash value alone. In certain embodiments, the ingest data includes metadata information, which may be partial (e.g., a number of parameters from an available set of metadata information). The ingest data can include network performance metrics data, metadata, tags, and/or combinations of these. In certain embodiments, the metadata and/or tags are passed to a separate flow at third procedural subset 506, and network performance metrics data is provided to a separate flow at second procedural subset 504. In certain embodiments, one or more metadata or tags are passed with the network performance metrics data for processing in the first procedural subset 502, but the operations of first procedural subset 502 can be performed without metadata and/or tags. In certain embodiments, one or more aspects of the metadata and/or tags are provided by the network device or process that communicates the network performance metrics data. In certain embodiments, one or more aspects of the metadata and/or tags are added to the data after initial collection. In certain embodiments, one or more aspects of the metadata and/or tags are inferred, for example in operations of the third procedural subset 506 as described following.

The example first procedural subset 502 includes operations of an ingest API, for example performed by a remote procedure call framework (e.g., the gRPC API in the example of FIG. 2), which may perform certain operations such as authenticating the caller (e.g., the device, service, and/or infrastructure element providing the data), storing an audit trail (e.g., logs and tracing), and passing the data off to a distributed streaming platform manager (e.g., Kafka® operating an Ingest Topic, in the example). The example first procedure subset 502 further includes operations of the distributed streaming platform manager. A first flow operation of the distributed streaming platform manager includes passing at least a selected portion of the data to a data processing manager (e.g., a Spark Worker) for high speed processing, such as detecting events (e.g., a utilization parameter, total usage parameter, thresholds of these, derivative values of these, etc.), providing an indication that an alert should be provided, determining that certain trigger conditions have been met, and/or determining that certain further processing operations should be performed (e.g., based on events, triggers, and/or thresholds met in the data). In the example first procedural subset 502, the distributed streaming platform manager determines whether to pass data to a high performance database (e.g., the left branch to Scylla, representing an interface to a database such as a ScyllaDB® brand Scylla Open Source database), to a long-term storage (e.g., the right branch to "S3"), or both. The data passed may be the data provided by the ingestion API, and/or processed data values provided by one or more Spark Workers.

The example procedure 500 further includes the third procedural subset 506 for indexing performance data, metadata, and/or tags. The example third procedural subset 506 includes a tagging API that may provide tags (and/or additional tags) to the data (e.g., a vendor, a location, a rack value, an application value, a line of business value flow, a record value, a service utilized value, a file accessed value, a destination value, an application utilized value, and/or a business related value of any type). In certain embodiments, operations of the third procedural subset 506 are performed as metadata and/or tags are available. In certain embodiments, operations of the third procedural subset 506 are performed in response to a query (see operations of fourth procedural subset 508) from a client or other end user.

The example third procedural subset 506 further includes an operation to update an elastic pod that associates metadata and/or tags with network performance data. For example, the operation to update the elastic pod includes determining associated metadata and/or tags with network performance data having a related deterministic hash value, such that the association can be made downstream of the ingestion of the network performance data regardless of the availability of metadata at the time of the ingestion of the network performance data. In certain embodiments, the association of the metadata and/or tags with the network performance data is generated in response to a query for performance data (e.g., for a pod including a particular network resource, for a business unit, for particular network devices, for a particular service utilized without regard to which network devices may have provided the service, etc.). In certain embodiments, the association of the metadata and/or tags is performed when data is available to make the association. In certain embodiments, the association of the metadata and/or tags is stored for future use (e.g., in a future query operation).

It can be seen that the operations of the third procedural subset 506 provide for a number of capabilities not available in previously known systems, and address a number of challenges of previously known systems. For example, operations of the third procedural subset 506 provide for a number of reporting and performance measurement operations that are not available in previously known systems—such as responding to queries based upon an associated business unit, type of business, type of service, access to particular services or resources, utilization of certain vendors, and/or any other business related aspect that does not correlate directly with a particular network device without further information being available. In certain embodiments, upstream network devices are instructed to provide one or more tag values or metadata values with the network performance data. In certain embodiments, one or more tag values or metadata values are attached to the network performance data downstream of the collector. In certain embodiments, one or more tag values or metadata values are attached in the operations of a Spark Worker (e.g., for a performance related tag). In certain embodiments, one or more tag values or metadata values are attached by the tagging API. In certain embodiments, one or more tag values or metadata values are attached recursively—for example where a system change has occurred, and the system change indicates that a previously tagged or untagged set of data should have a tag or a different tag. Certain operations of the third procedural subset 506 allow for the tracking and associating of data over time, and/or the back calculation of changes in data over time. For example, where a set of network performance data is associated with a first tag and/or metadata and changes to another tag and/or metadata (e.g., a network device begins serving a new business unit, a hardware change and/or server location change is implemented, etc.), and a second tag and/or metadata value is received, the operations of the third procedural subset 506 allow for changing the associated network performance data to the second tag and/or metadata value according to the time the change occurred, which may be determined at a time after the change has occurred. Accordingly, time windows of the network performance management data can be configured, in processing or post processing, to inform the network performance management system of the actual state of the system and/or to provide the network performance management information in manner that is more useful to the client or end user.

The example procedure further includes a fourth procedural subset 508 for processing queries received from a client, end user, and/or a computing device communicatively coupled to a system, for example system 100 depicted in FIG. 1. The example fourth procedural subset 508 includes operations (not depicted) to receive a query request, from a user in the example procedure 500. A query request can include a request for any type of network performance data, and may further include a desired time window, and/or certain types of information (e.g., systems operating off-nominally, having an event occurrence, or the like). In certain embodiments, a query request may include or reference any metadata and/or tags available in the system, such as: context tags; hardware and/or defined logical groupings of hardware; business units; locations; flow data information (e.g., traffic to certain users, servers, websites, applications, files, etc.); log data information; combinations of these; and/or time related values of any of these. In certain embodiments, a query is received through operations with the client, end user, and/or the computing device communicatively coupled to the system. Additionally or alternatively, a query may be scheduled (e.g., to support periodic and/or other intermittent reporting functions), be determined in response to an event occurrence (e.g., by a Spark Worker, activity related to a tag and/or a network device, etc.), and/or determined in response to an external event (e.g., a business event, a calendar time period elapsing or starting, a scheduled change in a business function, etc.).

The example fourth procedural subset 508 includes operations to process a query and to provide a performance report in response to the query. The example fourth procedural subset 508 includes an operation to pull query information from either the long-term storage or the high performance database portion of the stored data, or both (e.g., if the time window of data requires access to both the long-term storage and the high performance database portion). For example, the fourth procedural subset 508 includes an operation to determine whether the data to process the query is in the high performance database portion of the stored data, to access the available data from the high performance database portion, and to access any remaining data from the long-term storage. Depending upon certain factors, such as the time available to process the query and/or operational complications from using multiple data sources, information may be accessed only from the long-term storage even if the information or a portion of the information is available on the high performance database.

The example fourth procedural subset 508 further includes an operation to resolve the performance data according to associated metadata and/or tags. In certain embodiments, resolving the performance data includes requesting that the associating be performed (e.g., accessing third procedural subset 506). In certain embodiments, resolving the performance data includes accessing previously stored associations (e.g., utilizing an elastic search function or other stored association information previously prepared by the third procedural subset 506). In certain embodiments, portions of the performance data may be previously associated, and portions of the performance data may be associated and/or confirmed after the query is received. In certain embodiments, updated metadata and/or tags in the system may change a previously determined association, where the associating operations include updating the associations (e.g., a tag indicating a business unit related to a particular element of the performance data may have changed, whereby the association is changed to reflect the updated business unit after an initial association was made).

The example fourth procedural subset 508 further includes operations to provide a performance report to the client, end user, and/or the computing device communicatively coupled to the system. In certain embodiments, the fourth procedural subset 508 may interface with the client, end user, and/or the computing device communicatively coupled to the system using an API—for example a reporting API in the example of FIG. 5. Additionally or alternatively, interfacing with the client, end user, and/or the computing device communicatively coupled to the system can include access through a web portal, a built for purpose application, an application add-on for another application used by the client, end user, and/or the computing device communicatively coupled to the system, and/or through any other interface. A performance report, as used herein, should be understood broadly, and includes any information accessed and configured for communication to the client, end user, and/or the computing device communicatively coupled to the system, and additionally that utilizes at least one element of the performance data. In certain embodiments, utilizing at least one element of the performance data includes: determining a state or status of a hardware device; a business related determination (e.g., utilization of an application; and/or access to a web site, application, or file); aggregating and/or summarizing information (e.g., averages, sums, counts, utilization, and/or other descriptions); and/or determinations that information of interest is not presented in the performance data. Accordingly, while a performance report may include depictions of performance data and/or information derived from the performance data, a performance report may additionally or alternatively include none of the performance data, even where the performance report is prepared in response to the performance data. A performance report includes any information that is determinable from the performance data, and/or the performance data in view of any tags and/or metadata available in the system.

It can be seen that the operations of the fourth procedural subset 508 provide for a high degree of flexibility and control for a system 100 to analyze and configure performance reports that are not available in previously known systems. Additionally, operations of the fourth procedural subset 508 provide an interface for a client, end user, and/or computing device communicatively coupled to the system. For example, a first user associated with a particular client can configure performance reports to provide relevant information to a second user associated with the particular client, where the relevant information is at a level of abstraction that provides useful business information without the second user having any understanding of and/or any interest in the information as network performance data. In a further example, a query can include information such as utilization of a business element (e.g., applications, web sites, files, destinations for communications, etc.), determined from the performance data (e.g., according to servers, network nodes, and/or other network infrastructure elements), and configured for the business need of the second user that may not have any interest in the network infrastructure specifically.

In an example, the performance report may aggregate or otherwise process information based on the performance data, where the performance data utilized in conjunction with the metadata and/or one or more tags provides business related information that is not performance based. For example, server utilization in a first location (e.g., NJ) and server utilization in a second location (e.g., NY) provide a metric to track separate business functions in NJ and NY, which is derived from performance data related to the servers, but the underlying business information of interest, as well as the performance report, may be unrelated to the performance data per se. Additionally or alternatively, in a further example, off-nominal operations can be readily resolved—for example, during a period of time the server in NJ may be re-routed (e.g., due to network traffic, an outage, an upgrade, etc.) to replacement servers. In a further example, the replacement servers may provide performance data that has the NJ server tags added, allowing the performance report to seamlessly provide the relevant business related information even though the servers have been moved. It can be seen that the tags allow for the treatment of related information to be changed according to the purpose of the information—such as in the example system where the NJ servers were replaced for a period of time, the replacement servers may be treated the same as the NJ servers for certain purposes (e.g., tracking the NJ business function) but treated as the replacement servers for other purposes (e.g., tracking the performance of the replacement servers as network infrastructure elements). Additionally, it can be seen that the tags can be utilized to process and update previously stored information—for example where the replacement servers are tagged (e.g., with a time stamp defining the relevant periods) after the performance data is received and stored, allowing for the system to update the relevant business related information or other performance report information, in a post processing operation.

In another example, a performance report may be based only upon metadata and/or tags, and not utilizing the metric data. Accordingly, a performance portion of a performance report may reference business performance, context based performance, or another performance description that is unrelated to the metric data.

Figure 6:
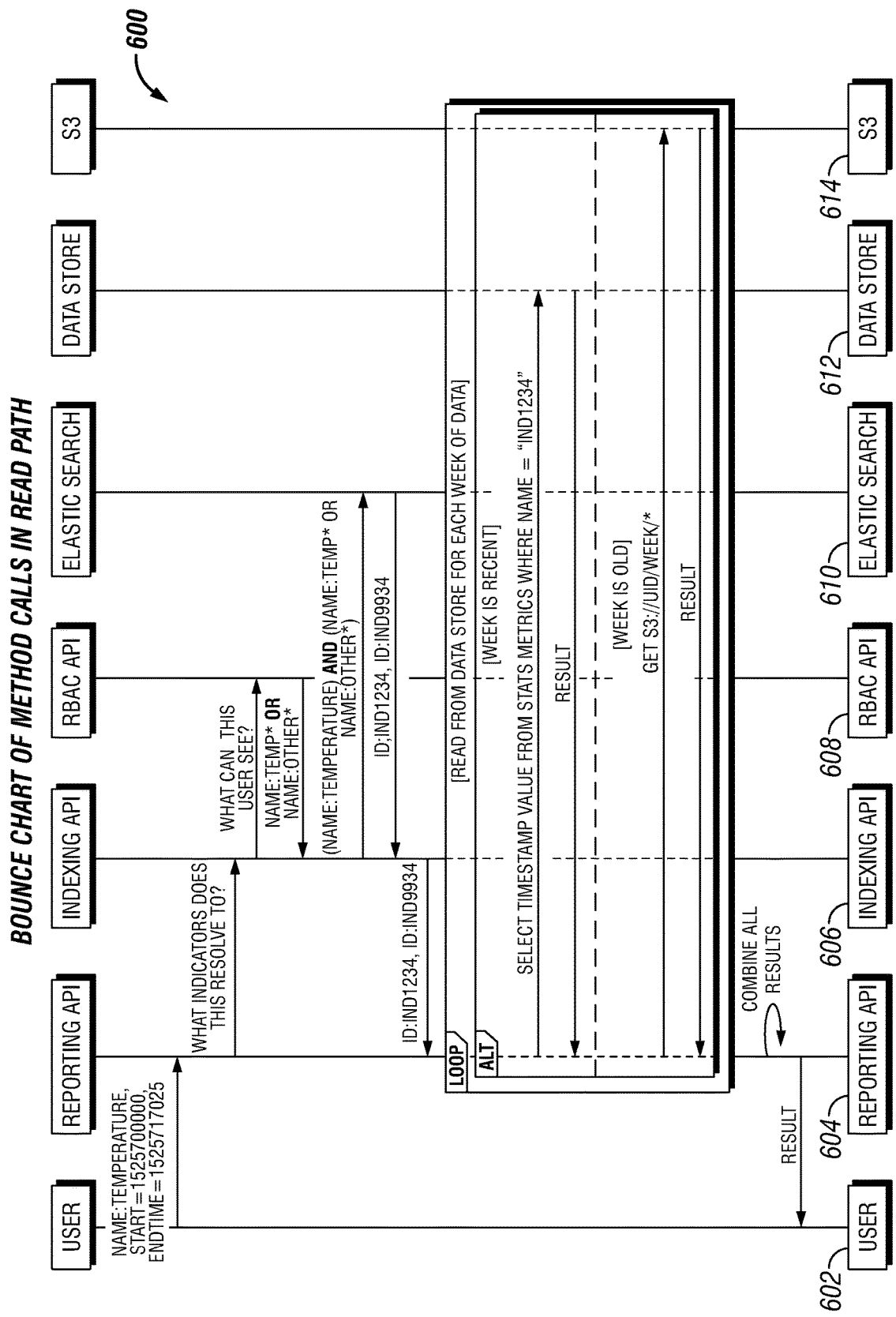
FIG. 6 is a schematic procedural workflow depiction to respond to a query.

Referencing FIG. 6, operations and data flow responsive to a received query are depicted schematically for an example system, such as system 100 depicted in FIG. 1. In the example of FIG. 6, the described operations to process the query are a non-limiting example depicted as a workflow 600, and operations are performed in progression from the top to the bottom. It is understood that operations may be added or omitted in whole or part, and/or performed in a different order than that depicted. The procedure includes receiving a query request (such as from a user 602), which may have information such as a query name or type, and/or time information related to the time of interest of the query. The query request may further include information such as a user, user role, authorization information for the user, etc.

In response to the received query, the example of FIG. 6 includes an operation to determine which indicators the query resolves to (e.g., which tags, metadata, and/or performance data portions), for example utilizing a reporting API 604, and an operation to determine whether the requester is authorized to receive a performance report utilizing the resolved indicators (and/or to access the resolved indicators), for example utilizing an indexing API 606 providing query and user information to a role-based access control (RBAC) API 608. The example of FIG. 6 further includes operations to associate the metadata, tags, and/or performance data portions of the query, for example by accessing the elastic search 610 function, utilizing a third procedural subset 506, and/or through any other operations described throughout the present disclosure.

The example of FIG. 6 further includes operations to retrieve the data responsive to the query from a stored location, including a high performance database (datastore 612 in the example of FIG. 6) and/or a long-term storage (cloud storage or "S3" 614, in the example of FIG. 6), utilizing the association between the metadata, tags, and/or performance data. The example of FIG. 6 further includes an operation to prepare the performance report ("combine all results" in the example of FIG. 6) in response to the retrieved data, for example utilizing the reporting API 604. The operation to prepare the performance report can be based upon parameters described in the query (e.g., defining time frames, requesting aggregation parameters, etc.) and/or may be based upon parameters associated with the query name, type, or a data field value in the query (e.g., predetermined values or operations stored in the system and associated with certain query names, types, or data fields provided in the query interface). The example of FIG. 6 additionally includes providing a responsive result (e.g., a performance report, utilizing the reporting API 604 in the example of FIG. 6) based upon the prepared performance report.

In certain embodiments, a performance report may be partially responsive to the query—for example providing certain information that can be compiled from authorized portions of the indicators within the query, and not providing other information that requires portions of the indicators that are not authorized. In certain embodiments, where at least a portion of the indicators are not authorized, a performance report may not be provided at all, and/or the requester and/or another user (e.g., an administrator within a client entity of the requester, and/or an administrator for the system performing the operations of FIG. 6) may receive a notification that the performance report exceeds authorization, and/or that an unauthorized query was received. In certain embodiments, additional authorization information may be requested (e.g., from an administrator within a client entity of the requester), allowing for another user with proper authorization to allow or block the query and/or portions of the query.

Figure 7:
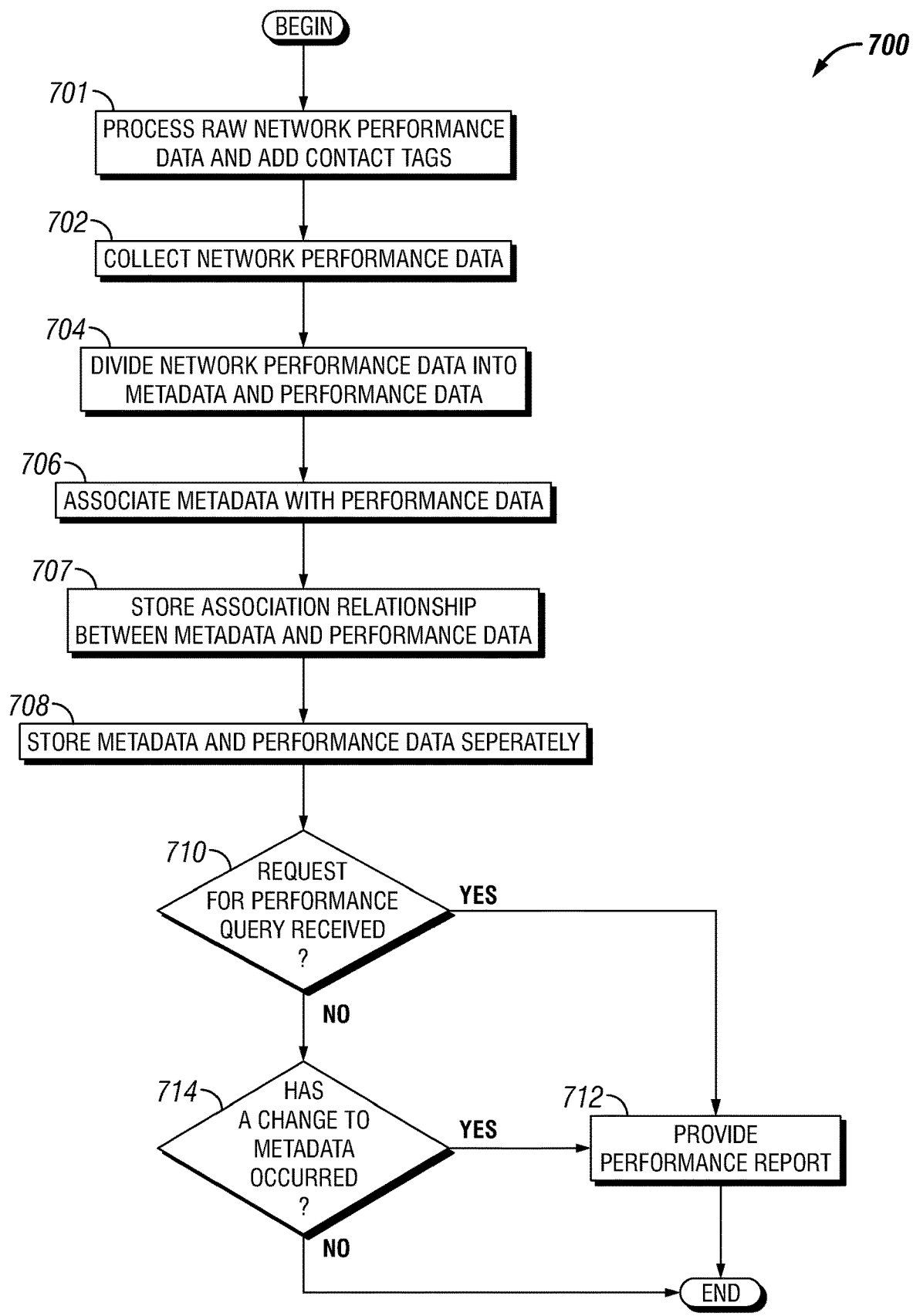
FIG. 7 is a schematic flow diagram depicting an example procedure to provide a performance report from network performance data including metadata.

Referencing FIG. 7, an example procedure 700 includes an operation 702 to collect network performance data from a plurality of network devices, where the network performance data includes a unique key (e.g., identifying and/or uniquifying the reporting device and/or the performance measured device). The example procedure 700 further includes an operation 704 to divide the network performance data into a metadata portion and a performance data portion, and an operation 706 to associate each of the metadata portion and the performance data portion with a corresponding unique key. The example procedure 700 further includes an operation 708 to store the metadata portion at a first location, and to store the performance data portion at a second location. In certain embodiments, the first location and the second location may be separate memory storage devices, and/or the first location and the second location may be separate memory locations on a memory device. The example procedure 700 further includes an operation 710 to receive a request for a performance query, and an operation 712 to provide a performance report in response to the request, wherein providing the performance report comprises matching at least a portion of the metadata portion with a corresponding at least a portion of the performance data portion.

Certain further operations of the example procedure 700 are described following, any one or more of which may be present in certain embodiments. The example procedure 700 includes the unique key including a deterministic hash value. In certain embodiments, the unique key may be a heuristically determined value—for example a value determined from the metadata that uniquely identifies a device or element of network infrastructure, and/or that is statistically likely to uniquely identify the device or element of network infrastructure. For example, a name of a source collector and/or source of the data (e.g., SNMP name) may be combined with other information, such as an IP address, that provides an identifier that is statistically likely to uniquely identify the source collector and/or the source of the data.

An example procedure 700 further includes the operation 702 to collect the network performance data including an operation to collect a first network performance data value having only performance data and a first unique key, collecting a second network performance data value having metadata and the first unique key, and where the operation 706 to associate the first network performance data value with the metadata of the second network performance data value is in response to the first unique key. An example procedure 700 includes the operation 712 to provide the performance report including a time series data for the performance data portion at least partially in response to the metadata portion. For example, the metadata portion may indicate a change in the data source, a change in a business value, and/or a change in a context value, where the time series data for the performance data portion is included for relevant portions of the performance data according to the change. An example procedure 700 include providing the performance report by aggregating at least one aspect of the performance data portion at least partially in response to the metadata portion. Aggregating, as used herein, should be understood broadly, and includes at least: summing performance data, counting instances or other aspects of elements of the performance data, averaging the performance data or portions of the performance data (e.g., a mean, median, mode, a geometric mean, or other representative value describing an aspect of the performance data), summarizing the performance data, reducing the performance data, and combinations of these.

An example procedure 700 further includes the operation 706 to associate each of the metadata portion and the performance data portion is performed after the operation 710 to receive the request for a performance query. An example procedure 700 further includes an operation 707 to store an association relationship between the metadata portion and the performance data portion in response to the associating. In certain embodiments, the metadata portion further includes a context tag, where the operation 712 to provide the performance report is further in response to the context tag. In certain embodiments, the context tag includes a vendor, a location, a rack value, an application value, and/or a line of business value. In certain embodiments, the context tag includes a flow record value, a service utilized value, a file accessed value, a destination value, an application utilized value, and/or a business related value. In certain embodiments, the operation 712 to provide the performance report further includes aggregating at least a portion of the performance data portion in response to the context tag.

An example procedure 700 further includes an operation 714 to track a change in response to the metadata portion, and the operation 712 to provide the performance report is further in response to the tracked change. In certain embodiments, operation 714 requests the operation 712 to provide the performance report in response to certain types of changes in the metadata, such as changes indicating a network infrastructure change, a business relevant change, or any other type of change according to a predetermined or calculated event detection. An example procedure 700 further includes an operation 701 to process raw network performance data to add a number of context tags to the raw network performance data, and thereby generate processed network performance data. In certain embodiments, the context tags form a portion of the metadata. In certain embodiments, the operation 702 to collect network performance data includes collecting the processed network performance data.

Figure 8:
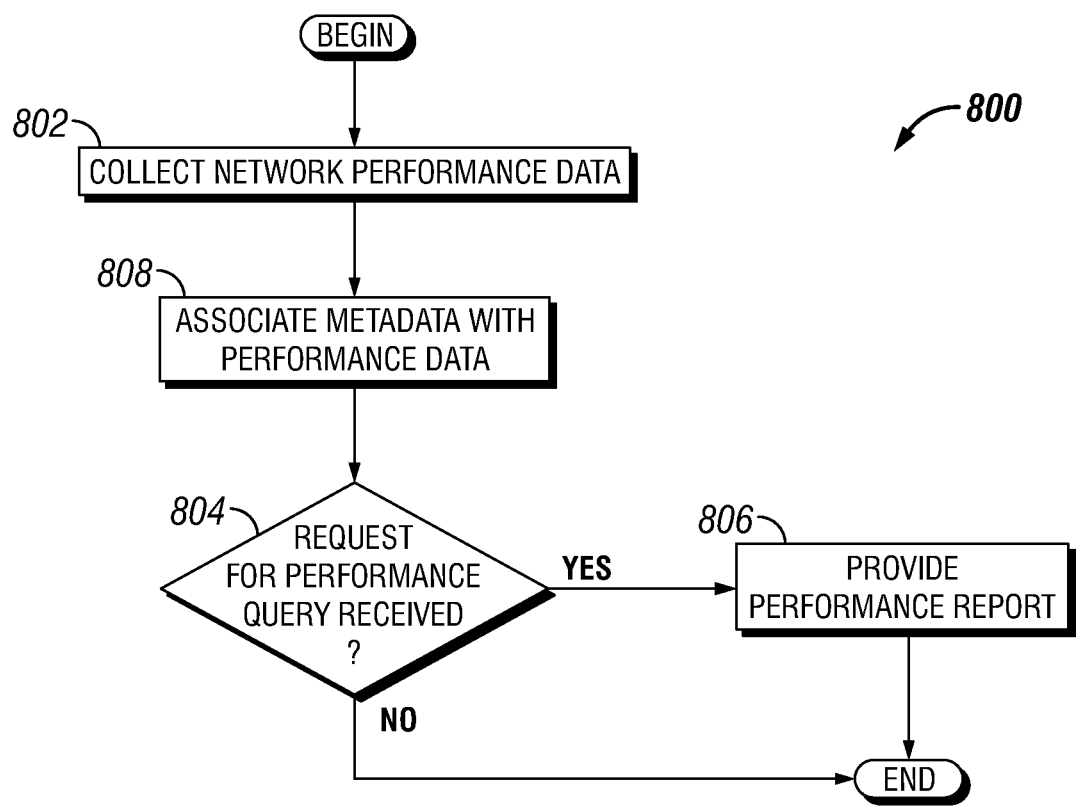
FIG. 8 is a schematic flow diagram depicting an example procedure to respond to a query.

Referencing FIG. 8, an example procedure 800 includes an operation 802 to collect network performance data from a number of network devices, where the network performance data includes metadata and a unique key. The example procedure 800 further includes an operation 804 to receive a request for a performance query, and an operation 806 to provide a performance report in response to the request, where providing the performance report includes processing the metadata in response to the unique key.

Certain further aspects of the example procedure 800 are described following, any one or more of which may be present in certain embodiments. In certain embodiments, the metadata further includes a context tag, and the operation 806 to provide the performance report is further in response to the context tag. In certain embodiments, the context tag includes a vendor, a location, a rack value, an application value, and/or a line of business value. In certain embodiments, the context tag includes a flow record value, a service utilized value, a file accessed value, a destination value, an application utilized value, and/or a business related value. In certain embodiments, the network performance data further includes a performance data portion. In certain embodiments, the procedure 800 further includes an operation 808 to associate the metadata with the performance data portion in response to the unique key, and the operation 806 to provide the performance report further includes aggregating at least a portion of the performance data portion in response to the context tag. In certain embodiments, the unique key includes a deterministic hash value.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

What is claimed is:

1. A method, comprising:
   collecting network performance data from a plurality of network devices, the network performance data comprising a unique key, wherein the unique key comprises a deterministic hash value;
   dividing the network performance data into a metadata portion and a performance data portion, and associating each of the metadata portion and the performance data portion with a corresponding unique key;
   storing the metadata portion at a first location, and storing the performance data portion at a second location;
   receiving a request for a performance query;
   providing a performance report in response to the request, wherein providing the performance report comprises matching at least a portion of the metadata portion with a corresponding at least a portion of the performance data portion;
   collecting a first network performance data value consisting of only performance data and a first unique key;
   collecting a second network performance data value comprising metadata and the first unique key; and
   associating the first network performance data value with the metadata of the second network performance data value in response to the first unique key.

2. The method of claim 1, wherein the providing the performance report further comprises determining a time series data for the performance data portion at least partially in response to the metadata portion.

3. The method of claim 2, wherein the providing the performance report further comprises aggregating the performance data portion at least partially in response to the metadata portion.

4. The method of claim 1, wherein the metadata portion further comprises a context tag, and wherein the providing the performance report is further in response to the context tag.

5. The method of claim 4, wherein the context tag comprises at least one of: a vendor, a location, a rack value, an application value, and a line of business value.

6. The method of claim 5, further comprising tracking a change in response to the metadata portion, and wherein the providing the performance report is further in response to the tracked change.

7. The method of claim 6, further comprising processing raw network performance data to add a plurality of context tags to the raw network performance data and thereby generate processed network performance data, and wherein the collecting network performance data comprises collecting the processed network performance data.

8. The method of claim 4, wherein the context tag comprises at least one of: a flow record value, a service utilized value, a file accessed value, a destination value, an application utilized value, and a business related value.

9. A system, comprising:
- a network performance data collection layer structured to collect network performance data from a plurality of network devices, the network performance data comprising a unique key, wherein the unique key comprises a deterministic hash value;
- a data distribution layer structured to divide the network performance data into a metadata portion and a performance data portion;
- a query management layer structured to provide a performance report in response to receiving a request for a performance query, and further structured to provide the performance report by associating each of the metadata portion and the performance data portion with a corresponding unique key;
- a means for aggregating the network performance data in response to a flow record; and
- wherein the query management layer is further structured to provide the performance report by matching at least a portion of the metadata portion with a corresponding at least a portion of the performance data portion, and to associate each of the metadata portion and the performance data portion after receiving the request for a performance query.

10. The system of claim 9, further comprising a performance change layer structured to identify a trigger event in response to the performance data portion.

11. The system of claim 10, further comprising a performance data storage layer structured to store at least a portion of the performance data portion in a responsive memory location.

12. The system of claim 9, further comprising a means for adding context tags to raw network performance data to create processed network performance data, wherein the network performance data comprises the processed network performance data.

13. The system of claim 9, wherein the metadata portion comprises at least one context tag, the system further comprising a means for detecting a trigger event in response to a context tag.

14. The system of claim 13, wherein the at least one context tag comprises at least one of: a vendor, a location, a rack value, an application value, and a line of business value.

15. The system of claim 13, wherein the at least one context tag comprises at least one of: a flow record value, a service utilized value, a file accessed value, a destination value, an application utilized value, and a business related value.

16. The system of claim 9, wherein the metadata portion comprises at least one context tag, the system further comprising a means for aggregating the network performance data in response to the at least one context tag.

17. A method, comprising:
- collecting network performance data from a plurality of network devices, the network performance data comprising a unique key, wherein the unique key comprises a deterministic hash value;
- dividing the network performance data into a metadata portion and a performance data portion, and associating each of the metadata portion and the performance data portion with a corresponding unique key;
- storing the metadata portion at a first location, and storing the performance data portion at a second location;
- receiving a request for a performance query;
- providing a performance report in response to the request, wherein providing the performance report comprises matching at least a portion of the metadata portion with a corresponding at least a portion of the performance data portion; and
- wherein associating each of the metadata portion and the performance data portion is performed after receiving the request for a performance query.

18. The method of claim 17, further comprising storing an association relationship between the metadata portion and the performance data portion in response to the associating.

19. The method of claim 17, wherein the providing the performance report further comprises determining a time series data for the performance data portion at least partially in response to the metadata portion.

20. The method of claim 19, wherein the providing the performance report further comprises aggregating the performance data portion at least partially in response to the metadata portion.

21. The method of claim 17, wherein the metadata portion further comprises a context tag, and wherein the providing the performance report is further in response to the context tag.

22. The method of claim 21, wherein the context tag comprises at least one of: a vendor, a location, a rack value, an application value, and a line of business value.

23. The method of claim 22, further comprising tracking a change in response to the metadata portion, and wherein the providing the performance report is further in response to the tracked change.

24. The method of claim 23, further comprising processing raw network performance data to add a plurality of context tags to the raw network performance data and thereby generate processed network performance data, and wherein the collecting network performance data comprises collecting the processed network performance data.

25. The method of claim 21, wherein the context tag comprises at least one of: a flow record value, a service utilized value, a file accessed value, a destination value, an application utilized value, and a business related value.

26. A system, comprising:
- a network performance data collection layer structured to collect network performance data from a plurality of network devices, the network performance data comprising a unique key, wherein the unique key comprises a deterministic hash value;
- a data distribution layer structured to divide the network performance data into a metadata portion and a performance data portion;
- a query management layer structured to provide a performance report in response to receiving a request for a performance query, and further structured to provide the performance report by associating each of the metadata portion and the performance data portion with a corresponding unique key;
- a means for adding context tags to raw network performance data to create processed network performance data, wherein the network performance data comprises the processed network performance data; and
- wherein the query management layer is further structured to provide the performance report by matching at least a portion of the metadata portion with a corresponding at least a portion of the performance data portion, and to associate each of the metadata portion and the performance data portion after receiving the request for a performance query.

27. A system, comprising:
a network performance data collection layer structured to collect network performance data from a plurality of network devices, the network performance data comprising a unique key, wherein the unique key comprises a deterministic hash value;
a data distribution layer structured to divide the network performance data into a metadata portion and a performance data portion;
a query management layer structured to provide a performance report in response to receiving a request for a performance query, and further structured to provide the performance report by associating each of the metadata portion and the performance data portion with a corresponding unique key; and
wherein:
   the query management layer is further structured to provide the performance report by matching at least a portion of the metadata portion with a corresponding at least a portion of the performance data portion, and to associate each of the metadata portion and the performance data portion after receiving the request for a performance query; and
   the metadata portion comprises at least one context tag, the system further comprising at least one of:
   a means for detecting a trigger event in response to a context tag, or
   a means for aggregating the network performance data in response to the at least one context tag.

* * * * *